United States Patent [19]
Jarsen

[11] 3,947,888

[45] Mar. 30, 1976

[54] HYDRODYNAMIC BEARING HEAD PROVIDING CONSTANT SPACING

[75] Inventor: Manfred H. Jarsen, Encino, Calif.

[73] Assignee: MCA Disco-Vision, Inc., Universal City, Calif.

[22] Filed: Oct. 1, 1973

[21] Appl. No.: 402,635

[52] U.S. Cl. .................................. 360/103; 360/99
[51] Int. Cl.² G11B 5/60; G11B 17/32; G11B 21/16; G11B 5/016
[58] Field of Search ............. 360/99, 102, 109, 103, 360/86, 97, 98, 75

[56] References Cited
UNITED STATES PATENTS

| | | |
|---|---|---|
| 2,905,768 | 9/1959 | Cronquist ......................... 360/103 |
| 3,178,719 | 4/1965 | Shapiro ............................. 360/102 |
| 3,327,916 | 6/1967 | Weidenhammer et al. ......... 360/102 |

*Primary Examiner*—Robert S. Tupper
*Attorney, Agent, or Firm*—Marvin H. Kleinberg

[57] ABSTRACT

A player for video disc includes a vacuum reading head to "read" recorded information from a thin, flexible video disc. A rotating turntable provides a fluid cushion bearing to support the disc and the vacuum associated with the transducing head assembly "draws" the disc toward the head and maintains an optimum head-to-disc spacing.

10 Claims, 6 Drawing Figures

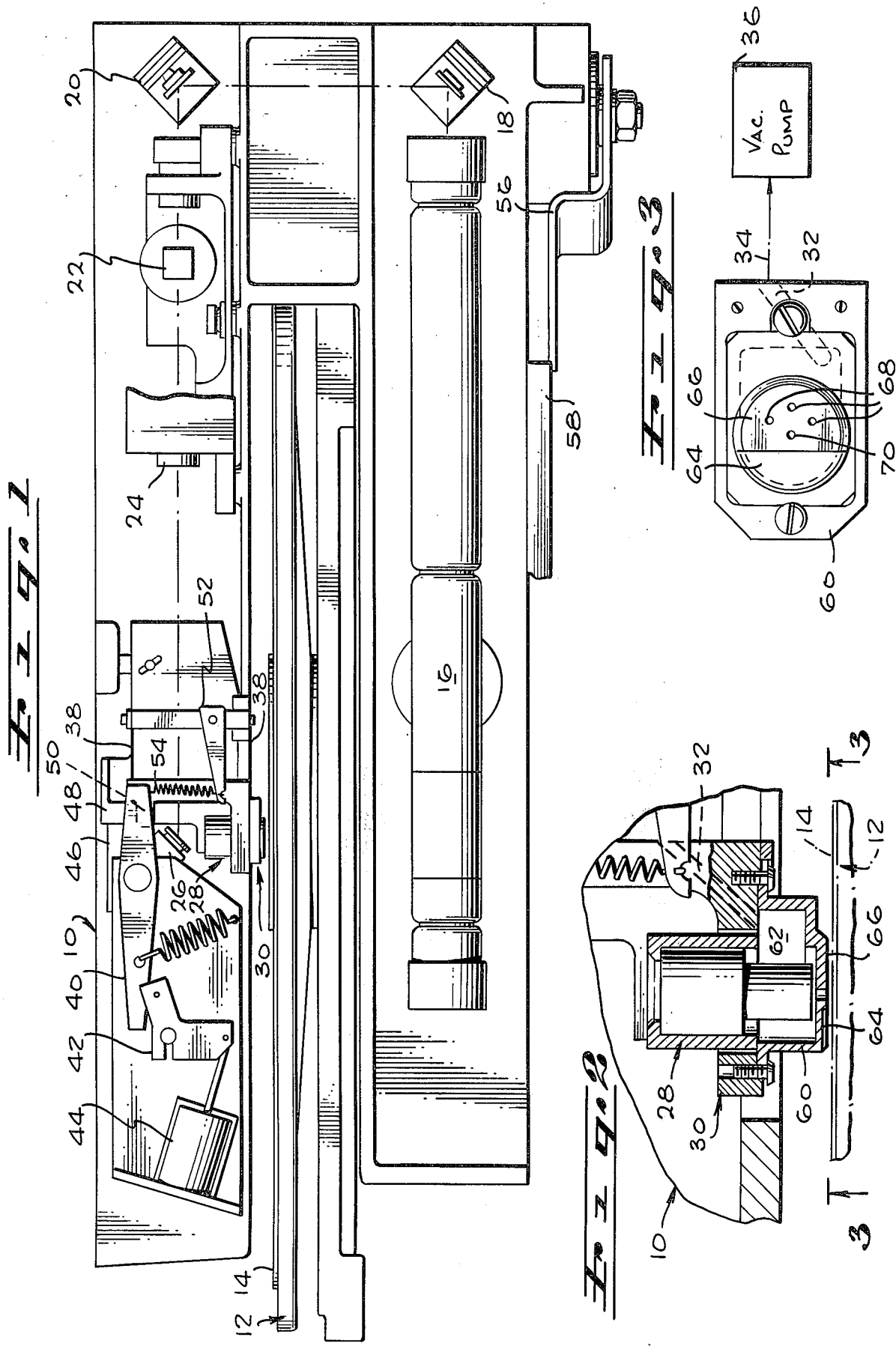

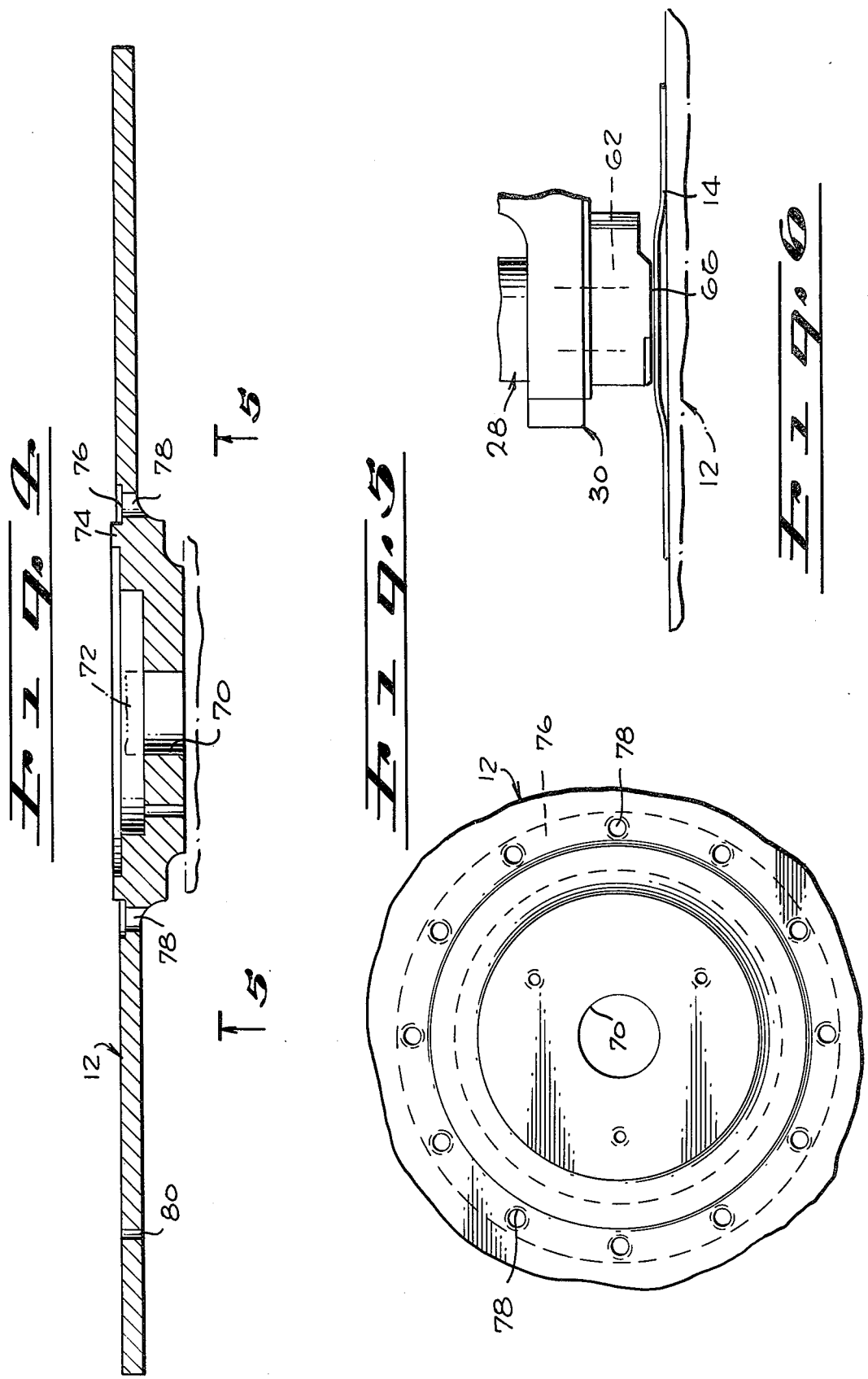

HYDRODYNAMIC BEARING HEAD PROVIDING CONSTANT SPACING

RELATED PATENT APPLICATIONS AND PATENTS

"Articulated Mirror" by James E. Elliott, Ser. No. 333,559, filed Feb. 20, 1973, now U.S. Pat. No. 3,794,410; "Video Disc Mastering System" by John S. Winslow, Ser. No. 333,560, filed Feb. 20, 1973, now abandoned; "Video Disc Player" by James E. Elliott, Ser. No. 314,082, filed Dec. 11, 1972, now U.S. Pat. No. 3,914,541; "Video Disc Player" by James E. Elliott, Ser. No. 299,893, filed Oct. 24, 1972, now U.S. Pat. No. 3,829,622; "Video Recording and Recording and Reproducing System" by Kent D. Broadbent, Ser. No. 299,892, filed Oct. 24, 1972; "Drop-Out Compensator" by Wayne Ray Dakin, Ser. No. 299,891, filed Oct. 24, 1972; "Video Record Disc and Process for Making Same" by David P. Gregg, Ser. No. 735,007, filed Jan. 27, 1969; "Duplicating Process for Video Disc Records" by Kent D. Broadbent, U.S. Pat. No. 3,658,954, issued Apr. 25, 1972; "Video Signal Transducer Having Servo Controlled Flexible Fiber Optic Track Centering" by David P. Gregg and Keith O. Johnson, U.S. Pat. No. 3,530,258, Issued Sept. 22, 1970; "Video Recording Medium and Transport" by David P. Gregg, U.S. Pat. No. 3,430,966, issued Mar. 4, 1969; "Photoelectric Transducer Head" by David P. Gregg, U.S. Pat. No. 3,349,273, issued Oct. 24, 1967; "Video Disc Playback Assembly" by Keith O. Johnson, U.S. Pat. No. 3,518,442, issued June 30, 1970; "Duplicating Process for Video Disc Records" by Kent D. Broadbent, U.S. Pat. No. 3,687,664, issued Aug. 29, 1972; "Method of Creating a Replicating Matrix" by Manfred H. Jarsen, Ser. No. 402,636, filed Oct. 1, 1973; "Fluid Cushion Turntable for Video Disc Player", by Manfred H. Jarsen, Ser. No. 402,634, filed Oct. 1, 1973.

BACKGROUND OF THE INVENTION

1. Field of the Invention

This invention relates to information retrieval apparatus and, more particularly, to an improved transducer head adapted to recover the video information which has been stored on the surface of a video disc.

2. Description of the Prior Art

It has been known that color video programs can be stored on magnetic tape for subsequent playback, utilizing appropriate video tape reading apparatus. It has also been disclosed that the same information can be recorded on a disc, either through photographic or other processes which achieve a physical defomation of the disc in a predetermined pattern, which can then optically "read" to recover a video signal suitable for application to a standard TV receiver.

In the teachings of the prior art, and especially the patents to Gregg and Johnson and the application of Elliott, supra, apparatus has been disclosed which is adapted to cooperate with the video disc disclosed by Gregg, Johnson, Broadbent, et al, supra. Continued experimentation has led to the development of video disc having a surface upon which information is stored as "holes" or depressions in a surface.

On a typical video disc, a given hole may be approximately 1 micron in width. A plurality of such holes of varying lengths are placed in a more or less continuous track on a surface of a disc. The disc is adapted to rotate at approximately 1800 rpm for playback. In alternative configurations, the disc may either have a continuous spiral track containing information or may include a plurality of discrete, circular tracks. In either embodiment, a track-to-track spacing of approximately 2 microns is maintained. At such rotational speeds, approximately 20 minutes of program can be accommodated on a 12 inch diameter disc.

In order to provide a commercially successful system, several requirements must be simultaneously satisfied. The video disc which contains the program material must be easily mass produced, able to take a certain amount of handling and must function on a playback instrument which must be reasonable in cost and sufficiently simple and rugged so that it might function in the environment of a home.

Techniques are available to mass produce discs using techniques which are analogous to those employed in the phonograph record industry. It has been determined that a video disc can be made of thin material without substantial lateral rigidity. Such a disc can accept information in a "hole-no-hole" pattern which can be optically recognized by suitable playback equipment. However, the flexibility of the thin plastic disc imposes certain requirements on the playback equipment. Because of the microscopic size of the tracks and the information recorded therein, an optical system must be provided which can discriminate between the presence or absence of a "hole" 1 micron wide in a series of similar holes.

The series of holes of interest is separated from an adjacent series of holes or track by approximately 1 micron, since the distance between the centers of adjacent tracks is in the preferred embodiment approximately 2 microns.

Sufficient energy must be applied to and recovered from the surface to distinguish between the surface states that represent information, and to provide an error signal which enables a control system to maintain the transducer in alignment with the track of interest in an environment of shocks and vibration.

In order to resolve, optically, a spot that is 1 micron in width, the distance between the object plane and the optical system should be held constant to within approximately a micron. If now the surface of the disc cannot be held planar within a micron, it is necessary to provide some mechanism that will preserve the spacing between the disc surface and a predetermined point in the optical system.

In the prior art, utilizing a substantially rigid disc, a reading head assembly had been disclosed which included a hydrodynamic or fluid bearing which, in conjunction with a mechanical force biasing the head towards the disc surface, maintained the head at a fixed distance from the disc with acceptable accuracy. With a nonrigid, flexible disc, it is necessary first to define the object plane in which the information track is found and then to provide a mechanism that maintains the spacing between that object plane and the optical system.

SUMMARY OF THE INVENTION

An improved playback system has been developed for reproducing video information from a flexible video disc. This improved system includes a turntable which provides a hydrodynamic fluid bearing which affords a noncontact support for the entire disc and, according to the present invention, an improved reading head which utilizes a negative pressure differential in the vicinity of the head.

The head may be considered substantially "rigid" and the disc may be deemed "compliant" in maintaining a predetermined spacing between the disc surface and the head. A fluid pressure system is responsive to the relative radial location of the playing arm to vary the pressure differential with radial location thereby maintaining a constant head-to-disc spacing independent of relative surface speeds. In alternative embodiments, a stationary back plate provides a partial fluid bearing support to the rotating, thin disc.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a side-section view of a player arm employing the vacuum reading head of the present invention;

FIG. 2 is a side-section view of the reading head of the present invention and associated apparatus of the player arm of FIG. 1 enlarged to show greater detail;

FIG. 3 is a bottom view of the vacuum head of FIG. 2 taken along the line 3—3 in the direction of the appended arrows;

FIG. 4 is a side-section view of an air cushion turntable;

FIG. 5 is a bottom view of the turntable of FIG. 4 taken along the line 5—5 in the direction of the appended arrows; and FIG. 6 is an idealized side view, not to scale, showing the cooperative relationship among the head of FIG. 2, the turntable of FIG. 4, and a thin video disc.

Turning first to FIG. 1, there is shown in the elements of a player arm 10 illustrated in operable cooperation with a turntable 12. As seen, the turntable 12 has a video disc 14 mounted thereon. The player arm 10 includes a radiant energy source 16 shown here as a laser whose output beam is directed through first and second mirrors 18, 20 to the upper half of the player arm 10.

The optical path includes a beam splitter 22, a quarterwave plate 24, and an articulated mirror assembly 26. The articulated mirror assembly 26 directs the laser beam through a lens assembly 28, which is an integral part of the reading head 30 of the present invention.

The head 30, as shown, is supported from the player arm 10 by a pair of flexible leaf springs 38. These leaf springs 38 are insufficient by themselves to support the weight of the reading head 30, and accordingly, additional apparatus is provided to support the head 30 when information is not being read from the disc 14.

A lever arm 40 which is coupled to the reading head 30 and which operates through a linkage 42 coupled to a dash pot 44, normally supports the reading head 30. When it is desired to release the head 30, a solenoid (not shown) operates upon the linkage 42 which rotates the lever arm 40, lowering the head 30 until a stop member carried by the head 30 engages a supporting plate 48 of the player arm 10.

The head 30 is then constrained to ride at some fixed distance from the player arm 10 which is controlled by the adjustment of the stop member 46. A tab 50 is carried by the lever arm 40 which enables the arm to cam the head 30 upwards. A bias lever 52 is coupled through a bias spring 54 which is fastened to the reading head 30 and urges the head downward toward the disc 14.

The vacuum pump 36 is coupled to the vacuum orifice 32 through the tube 34. The amount of the vacuum drawn from the head 30 is determined by a cam follower apparatus 56 cooperating with a vacuum system control 58 which regulates the vacuum as a function of arm 10 radial travel, comparable to the cam controlled bias shown in the Elliott application, supra.

Turning next to FIGS. 2 and 3, there is shown in greater detail the reading head 30 according to the present invention. As seen, the reading head 30 includes a lens assembly 28 which is basically a microscope objective lens system that directs an illuminating beam to a focus at the surface of the disc 14. Reflected light from the disc 14 returns through the same optical path.

The reading head 30 includes a foot portion 60. The interior of the head 30 is substantially hollow to accommodate the lens assembly 28. A vacuum orifice 32 is coupled through tubing 34 to a suitable vacuum pump 36. The open, interior are 62 above the foot portion 60 can be considered a vacuum chamber which communicates to the vacuum pump 36 through the tube 34.

The surface of the foot portion 60 includes a step 64 which is capable of creating a hydrodynamic bearing between the video disc 14 and the foot 60. Such a bearing created when the disc 14 rotates, is capable of supporting head 30 on the area of a sole plate portion 66 of the foot portion 60.

As is better seen in FIG. 3, the sole plate 66 is provided with a plurality of orifices 68, one of which, orifice 70, also functions as the "window" through which the radiant beam travels between the lens assembly 28 and the disc surface 14. As in the earlier, copending Elliott application, the hydrodynamic bearing formed by step 64 would be sufficient to support the weight of the entire reading head assembly 30 were it not for the vacuum system. To assure appropriate spacing, various bias forces may be brought to bear upon the head assembly 30, uring it toward the surface of the disc 14. This mode of operation is, of course, necessary and desirable when dealing with the rigid video disc of the prior art or a master disc.

The alternative and preferred embodiment of the video disc comprises a flexible disc member 14, which is itself supported on the turntable 12 by an air bearing as is more fully described in the copending Jarsen application, supra. The disc 14 therefore "floats" between the turntable 12 on the one side and the sole plate 66 of the head assembly 30 on the other.

FIGS. 4 and 5 illustrate the turntable 12 which creates such a support bearing for the disc 14. The turntable 12 includes a central opening 70 which is adapted to receive a spindle 72. A central rim or shoulder 74 is provided about the inner area which supports the center portion of the video disc, when it is clamped in place on the spindle 72.

An annular groove 76 is placed on the surface of the turntable 12 and is outwardly displaced from the rim or shoulder 74. An orifice 78 connects the groove 76 to the opposite side of the turntable 12 and acts as a conduit to supply air into the groove 76.

Depending upon the mass of the disc 14 and the characteristics of the turntable 12 at its normal rotational speed of 1800 rpm, additional, secondary orifices 80 can be located at more remote radial locations of the turntable 12, to provide an additional air supply into the area between the turntable 12 and the disc 14.

Rotation of the turntable 12 and normal hydrodynamic forces causes a flow of fluid, that is air, through the orifices 78, 80 and between the turntable 12 and the disc 14. The air flow is directed to the outer periphery of the turntable 12 and is adequate to provide a fluid cushion under the disc 14 which can support the disc against its own weight.

Turning next to FIG. 6, there is shown, in somewhat idealized form and enlarged, but not to scale, the manner in which the head 30, the disc 14 and the turntable 12 cooperate to maintain a constant predetermined spacing between the lens assembly 28 and the surface of the disc 14. It will be noted that the lens assembly 28 is positioned to be at a predetermined spacing from the interior surface of the sole plate portion 66.

A fixed and predetermined distance then exists to the exterior surface of the sole plate portion 66. Based upon the optical parameters of the system, it is desirable that the surface of the disc 14 be at some equally fixed and predetermined distance from the surface of the sole plate 66 for optimum resolution of the illuminating spot.

As the turntable 22 revolves, the air cushion created between the surface of the turntable 12 and the disc 14 supports the disc 14. At the same time, the open area vacuum chamber 62 is connected to the vacuum pump 36 which evacuates the chamber and creates a negative pressure differential relative to the surface of the video disc 14.

Accordingly, as an incremental area of the disc 14 comes into proximity of the head 30, the negative pressure differential causes the disc 14 to be locally deformed from its normally planar shape. The relatively higher air pressure supporting the disc 14 on the turntable 12 and the relatively lower pressure in the vicinity of the sole plate 66 causes the disc to approach the sole plate 66, as shown. The magnitude of the vacuum within the chamber 62 determines the distance between the disc 14 and the sole plate 66.

Since the circumferential velocity of any increment of the disc 12 is a function of the radial distance of that increment from the center, and since the bearing created is directly related to circumferential velocity, it is ncessary to vary the magnitude of the vacuum as a function of radial displacement of the head 30. To that end, assembly 56 cooperates with a vacuum system control 58 so that for each radial location of the head, a predetermined vacuum can be created in the vacuum chamber 62, thereby maintaining a substantially constant spacing between the surface of the disc 14 and the sole plate portion 66 of the head 30.

In operation, as contrasted with the earlier Elliott application, the disc 14 is the relatively complaint member and the "defeat" of the air bearing between the head 30 and the disc determines the amount of deformation of the disc and the operational distance to the recorded track. However, the actual amount of mass affected remains substantially constant.

The deformation is in actuality, more like a "dimple" than the "hump" pictured in FIG. 6 which has been purposely exaggerated for purposes of description and explanation. The "coarse" adjustment for the reading head can be achieved by adjusting the position of the stop member 46. The "fine" adjustment is then controlled by the vacuum system and the negative pressure differential created.

Thus there has been shown an improved combination for maintaining a fixed head to surface spacing to optimize an optical, noncontact scanning system to bring a sharply focused illuminating beam to the disc surface and to return a reflected image from the surface, as affected by the surface deformations representing information.

I claim:

1. In an information handling system including an information bearing medium having indicia established therein and having a surface, and a transducer head assembly for communicating with the medium and adapted to access the surface, the transducer head assembly having a surface for generating a hydrodynamic bearing and being supported at a predetermined distance interval from the surface by a hydrodynamic bearing created by relative motion between the medium surface and the transducer hydrodynamic bearing generating surface while being immersed in a fluid medium, apparatus for modifying the interval between the transducer and the medium surface comprising:
   a. a source of fluid under less than ambient pressure; and
   b. communicating means between said less than ambient pressure fluid source and the area between the transducer head assembly and the medium surface, said means being coupled to the transducer head assembly and carried thereby, whereby the relative spacing defining the interval between the transducer head assembly and the medium surface is changed by modifying the fluid pressure existing in the interval between the transducer head assembly and the medium surface.

2. The apparatus of claim 1, above, wherein said communicating means include an orifice in the transducer head assembly adjacent the interval between the transducer and the medium surface for affecting the fluid pressure in the interval.

3. The apparatus of claim 2, wherein the information handling system operatively includes said orifice to transmit information between the medium and the head assembly.

4. The apparatus of claim 1, above, wherein said communicating means include an orifice located in the hydrodynamic fluid bearing surface.

5. The apparatus of claim 1, above, wherein said communicating means include a chamber interior to the transducer head assembly and further include means coupling said chamber to said source of fluid at less than ambient pressure and to the interval between the transducer head assembly and the medium surface.

6. The apparatus of claim 1, wherein said communicating means include an orifice in the transducer head assembly adjacent the interval between transducer and medium surface; a chamber interior to the transducer head assembly communicating with said orifice including a conduit coupling said chamber to said source of less than ambient pressure fluid for modifying the hydrodynamic pressure in the interval to change the magnitude of the interval.

7. The system of claim 1, in which the information bearing medium is a relatively flexible member capable of translational motion with respect to the transducer head assembly and wherein a reduction of the fluid pressure in the area of the interval causes the flexible member to approach the transducer head assembly.

8. The system of claim 1, in which the information bearing medium is a relatively inflexible member capable of translational motion with respect to the transducer head assembly and wherein a reduction of the fluid pressure in the area of the interval causes the transducer head assembly to approach the information bearing medium.

9. For use with an information handling system including an information bearing medium having indicia established therein and having a surface, a source of fluid under less than ambient pressure, a transducer head assembly for communicating with the medium and adapted to access the surface, the transducer head assembly being supported at a predetermined distance interval from the surface by a hydrodynamic bearing created by relative motion between the surface and the transducer while being immersed in a fluid medium, the transducer head assembly comprising:

a. a transducer head body including a hydrodynamic bearing surface adjacent the information bearing medium for creating a hydrodynamic bearing between said head assembly and the medium surface;

b. a chamber interior said transducer head body coupled to the source of fluid under less than ambient pressure;

c. at least one orifice in said hydrodynamic bearing surface connecting the hydrodynamic bearing surface and the chamber for establishing fluid communication between the source of fluid under less than ambient pressure and the interval between the hydrodynamic bearing surface and medium surface; and d. information transmission means operatively employing said orifice for transmitting information between the information bearing medium and the information handling system, whereby changes in the fluid pressure within said chamber are communicated to the interval between said hydrodynamic bearing surface and the medium surface for changing the magnitude of the interval.

10. The transducer head assembly of claim 9, above, further comprising additional orifices in said hydrodynamic bearing surface communicating between said chamber and the area of the interval between the medium and said hydrodynamic bearing surface.

* * * * *